United States Patent
Rizq et al.

[11] Patent Number: 6,154,537
[45] Date of Patent: Nov. 28, 2000

[54] METHOD AND APPARATUS FOR REDUCING FALSE RINGBACK DETECTION

[75] Inventors: Nader Rizq; Martin T. Karanja, both of Plantation; Chin Pan Wong, Weston, all of Fla.

[73] Assignee: Motorola, Inc., Schaumburg, Ill.

[21] Appl. No.: 09/072,165

[22] Filed: May 4, 1998

[51] Int. Cl.[7] .................................................. H04M 11/00
[52] U.S. Cl. ............................................ 379/387; 379/386
[58] Field of Search ..................................... 379/386, 351, 379/387, 389

[56] References Cited

U.S. PATENT DOCUMENTS

| | | | |
|---|---|---|---|
| 4,689,760 | 8/1987 | Lee et al. ................................. | 379/351 |
| 5,321,745 | 6/1994 | Drory et al. ............................. | 379/351 |
| 5,450,484 | 9/1995 | Hamilton . | |
| 5,563,942 | 10/1996 | Tulai ....................................... | 379/351 |

*Primary Examiner*—Stella Woo
*Attorney, Agent, or Firm*—Scott M. Garrett

[57] ABSTRACT

In a communication device, a decoded audio signal is evaluated by a detection function (112). Two portions of the decoded audio signal spectrum are evaluated, a ringback band (206), and the remaining band(s). The signal strength in the ringback band is measured against a preselected ringback energy threshold level and the non-ringback signal strength is measured against a voice energy threshold level. Only if the ringback energy is above the ringback energy threshold level and the non-ringback band energy is below the voice energy threshold level will a ringback filter be applied to the audio signal.

17 Claims, 3 Drawing Sheets

METHOD AND APPARATUS FOR REDUCING FALSE RINGBACK DETECTION

TECHNICAL FIELD

This invention relates in general to digital telephony, and more particularly to digital telephones receiving encoded signals that may comprise ringback tones as well as voice data.

BACKGROUND

In digital communication systems it is common to encode voice data to reduce the bandwidth needed to effectively transmit the voice signal. A great many encoding schemes have been developed and are well known in the art. However, in processing digital telephony signals, a problem has arisen with regard to the detection of ringback signals.

Ringback signals are sent to a calling party so that a tone or tones can be played over the audio output device, typically the earpiece, to indicate to the caller that the called telephone is ringing. To produce a clean ringback signal prior to playing the ringback signal a ringback filter function may be employed. The ringback filter is a simple bandpass filter that passes the ringback tone or tones and rejects the harmonics and sub-harmonics of the ringback signal. To determine when a ringback signal is being received, a detection function may be used. The detection function examines the ringback band. The best prior art ringback detection is performed by using a linear predictive coding (LPC) filter that models the anticipated ringback signal and looks for a match in the received audio signal. If the output of the LPC filter indicates that there is sufficient correspondence to the ringback model in the ringback band, the ringback filter is applied to the signal prior to playing the signal over the audio transducer.

However, in spite of the complexity and sophistication of a LPC filter based detection scheme, false ringback detection still occurs. This happens when received voice data contains discrete frequency components in the ringback band that are similar enough to a ringback signal to fool the LPC filter detection, resulting in the ringback filter being applied to the voice data, causing an undesired distortion of the voice signal. A user may perceive this distortion as an indication of interference, or simply a poor quality product. Therefore there is a need to reduce false ringback detection.

DETAILED DESCRIPTION OF A PREFERRED EMBODIMENT

Figure 1:
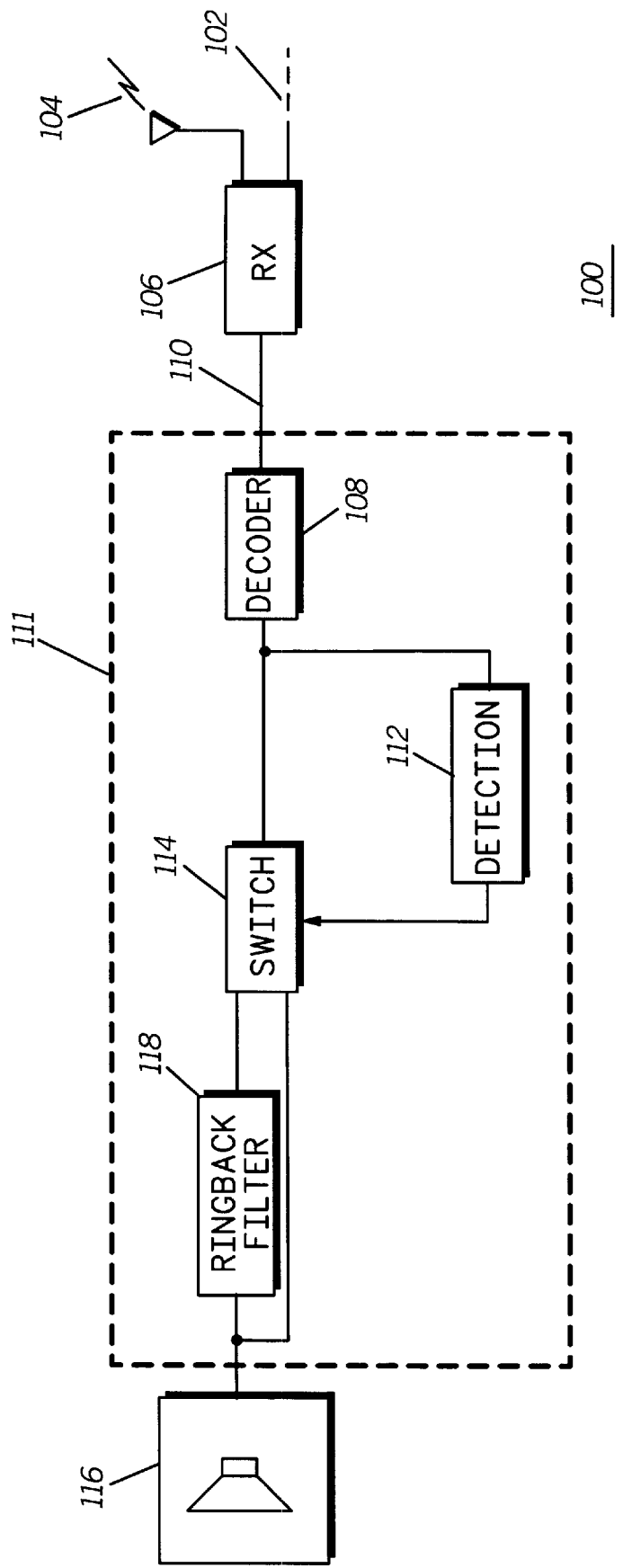
FIG. 1 shows a block diagram of a portion of communications device for processing telephony signals in accordance with one embodiment of the invention.

While the specification concludes with claims defining the features of the invention that are regarded as novel, it is believed that the invention will be better understood from a consideration of the following description in conjunction with the drawing figures, in which like reference numerals are carried forward.

The present invention reduces false ringback detection by not only evaluating the ringback band, but by also analyzing the spectrum of the received audio signal outside the ringback band. Instead of applying the ringback filter when there is sufficient activity in the ringback band, the present invention further examines the activity outside the ringback band to see if it is sufficiently low to indicate a lack of received voice information.

When both conditions are met, it is inferred that a ringback tone is being received, thus reducing the occurrences of false ringback detection. By examining both the ringback band and the non-ringback band, simpler filters may be employed, and the ringback filter may be re-used.

Referring now to FIG. 1, there is shown therein a block diagram of a portion 100 of a communication device for processing telephony signals in accordance with one embodiment of the invention. Specifically, the portion shown is a portion for receiving and processing a digital audio signal. A digital signal is received from a channel, such as a wired network connection 102 or a wireless air interface 104. Typically the signal will be a radio frequency (RF) signal modulated according to any of the known digital modulations schemes. A receiver 106 receives the signal and demodulates it to obtain data. Typically the data is encoded, and where the data is voice data, a common encoding scheme is vector sum excited linear prediction (VSELP), as used in half-rate global system for mobile communication (GSM) telephony. The receiver is preferably coupled to a decoder 108 by a bus 110. The decoder performs decoding of the data received from the receiver, as is commonly practiced in the art. The decoder may be a hardware device, but in the preferred embodiment the decoder function is performed by software executed by a digital signal processor 111, such as a model no. DSP56300 manufactured and sold by Motorola, Inc., as is well known in the art. In the preferred embodiment the decoder performs VSELP decoding. The output of the decoder, or the results of the decoder software function, are passed to a ringback detection block 112.

It will be appreciated by those skilled in the art that, while the lines shown interconnecting the various blocks shown could represent a physical bus, in the preferred embodiment they merely represent signal flow. In using digital signal processing techniques to perform the various signal processing functions and steps described herein, it will be apparent to those skilled in the art that passing data from one block to another may be performed, for example, by storing a result in a memory of a DSP, then calling the appropriate software function to operate on the data to achieve a new output.

The detection block 112 is responsible for deciding if the data being received is ringback data. To accomplish this the detection block performs two functions. First, the signal energy in the ringback band is evaluated. The ringback band is the band of the audio frequency spectrum in which ringback tones fall. In the U.S., ringback comprises two tones, one at 440 Hz and another at 480 Hz, thus the ringback band is generally from just below 440 Hz to just above 480 Hz. In the prior art the evaluation of the ringback band is the only test typically performed for ringback detection, and it is preferably done with a sophisticated LPC filter. However, in the present invention, the detection block also evaluates the signal outside of the ringback band, i.e. the non-ringback band. Both tests can be achieved by, for example, performing a discrete fourier transform of a data sample, and comparing the magnitude of the frequency components in the relevant spectral segments against expected levels for ringback signals. In the portion of the signal spectrum outside of the ringback band, the non-ringback band(s), a lack of energy will be found while receiving ringback tones, since, by definition, the called party has not answered and cannot be sending voice information. Thus, the present invention requires that not only must there be sufficient activity in the ringback band, there must also be a lack of activity outside the ringback band before the received signal is judged to ringback tones.

A switch block 114 is used to represent this decision. If either there is a lack of sufficient signal strength (energy) in the ringback band, or if there is sufficient signal strength outside of the ringback band, the decoded audio signal outputted from the decoder 108 is passed directly to an audio processor 116 for playing to a user. However, if there is sufficient signal strength in the ringback band, and a lack of signal strength outside the ringback band, then a ringback filter 118 is applied to the decoded audio data before passing it to the audio processor. The audio processor comprises prior art audio circuitry for converting the decoded audio digital information to an analog signal which is applied to an audio transducer, such as the speaker of a telephone earpiece.

Figure 2:
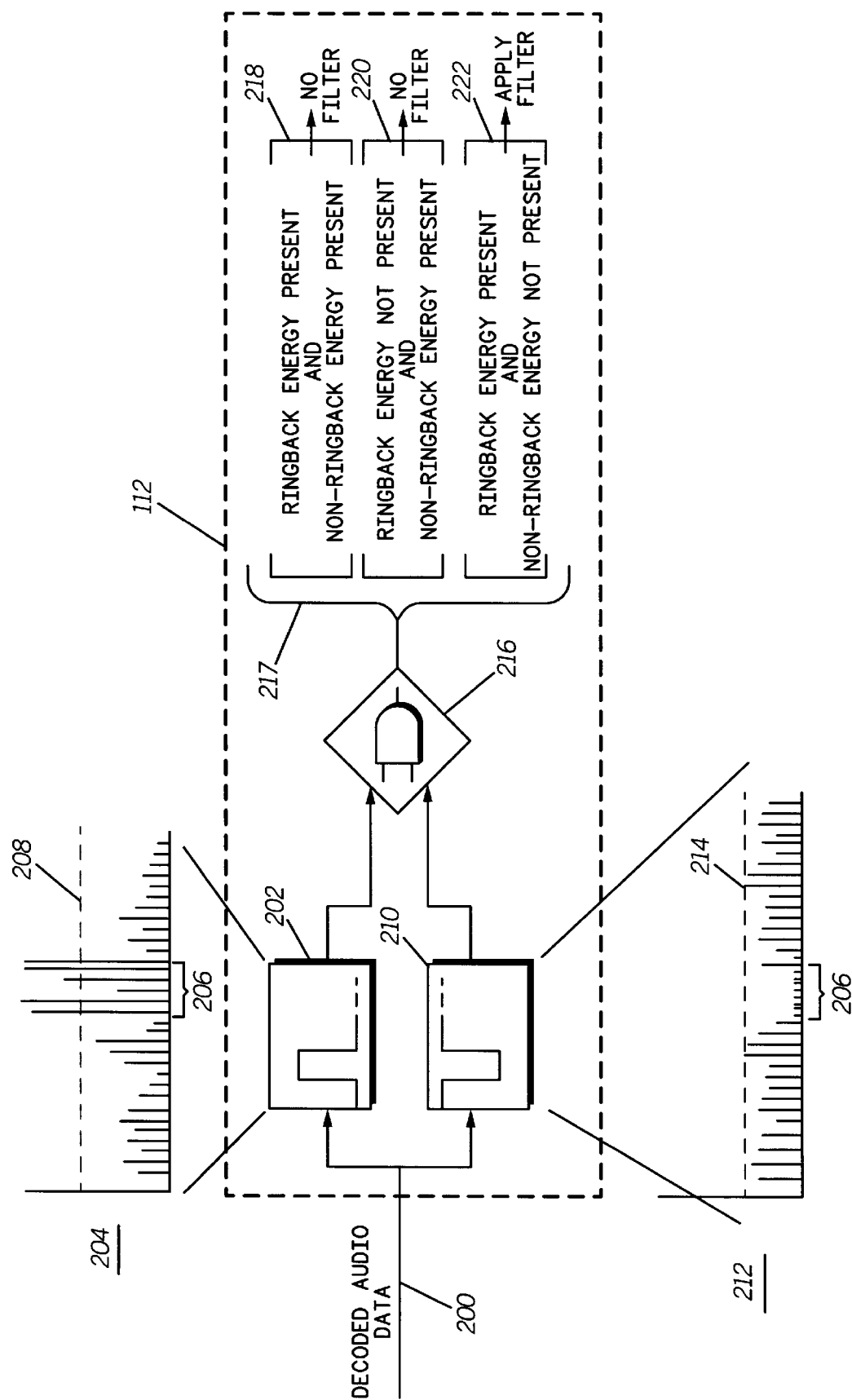
FIG. 2 illustrates the operation of a detection means for deciding if a ringback tone is present, in accordance with one embodiment of the invention.

FIG. 2 illustrates the operation of the detection block 112. Referring now to FIG. 2, the decoded audio signal is fed to the detection block, as represented by line 200. In a hardware embodiment line 200 would represent a bus, and in a software embodiment the line 200 could represent the data being passed to different software functions. As mentioned, the detection block performs a typical detection step of evaluating the signal strength in the ringback band, as represented by a bandpass filter 202. A detail of the bandpass filter function is shown in graph 204, where discrete frequency components are graphed vs. signal strength or energy. The discrete frequency components outside of the ringback band 206 are rejected, and the discrete frequency components in the ringback band are passed. The signal strength in the ringback band is compared to a preselected ringback energy threshold level 208. The same data evaluated by the bandpass function is also evaluated by a bandstop function 210, where discrete frequency components in the ringback band are rejected or attenuated. A detail of the bandstop filter function is shown in graph 212. The discrete frequency components outside the ringback band are compared to a preselected voice energy threshold level 214.

The results of the comparisons performed in the bandpass block 202 and bandstop block 210 are evaluated logically by the equivalent of an AND function 216. The results of which are shown in a table 217. There are four possible results, three of which are shown to illustrate the novel operation of the invention. The first scenario 218 occurs when sufficient ringback energy present. That is, the signal strength in the ringback band exceeds the preselected ringback energy threshold level, as determined by the bandpass function 202. The second condition of the first scenario 218 is that, as determined by the bandstop function 210, the non-ringback energy, the energy outside the ringback band, exceeds the preselected voice energy threshold level 214, indicating that voice is present. In a prior art ringback detection scheme, the first scenario 218 would convict the received audio signal as a ringback tone or tones because of the signal content in the ringback band. However, according to the invention, no ringback filtering is applied because the signal content outside the ringback band indicates the presence of voice information, thus, applying the ringback filter would result in a distorted voice signal as in the prior art devices.

The second scenario 220 occurs when the bandpass function indicates a lack of ringback energy and the bandstop function indicates the presence of voice information, resulting in no ringback filtering being applied to the decoded audio signal. The third scenario 222 occurs when the bandpass function determines that sufficient ringback energy is present and the bandstop function determines that the non-ringback energy, the energy outside the ringback band, is sufficiently low. In this case, then ringback filtering will be applied to the decoded audio signal. It will be appreciated by those skilled in the art that a fourth scenario can and will occur, where neither the ringback band or the non-ringback band contains significant signal energy, and both in the present invention and the prior art no ringback filtering is applied in such a case.

In the preferred embodiment the bandpass and bandstop functions are implemented by digital filtering techniques, and either infinite impulse response or finite impulse response techniques will perform adequately. The energy of the two filters is computed by using any of the conventional DSP energy computation techniques, such as, for example, a sum of squares algorithm. The energy estimate is then compared to the corresponding threshold level. The threshold levels are determined experimentally for the particular application. In general, the threshold level is selected so that the ringback energy threshold level corresponds to the energy of a received ringback signal, and the voice energy threshold corresponds to an energy level sufficient to indicate the presence of voice activity.

Figure 3:
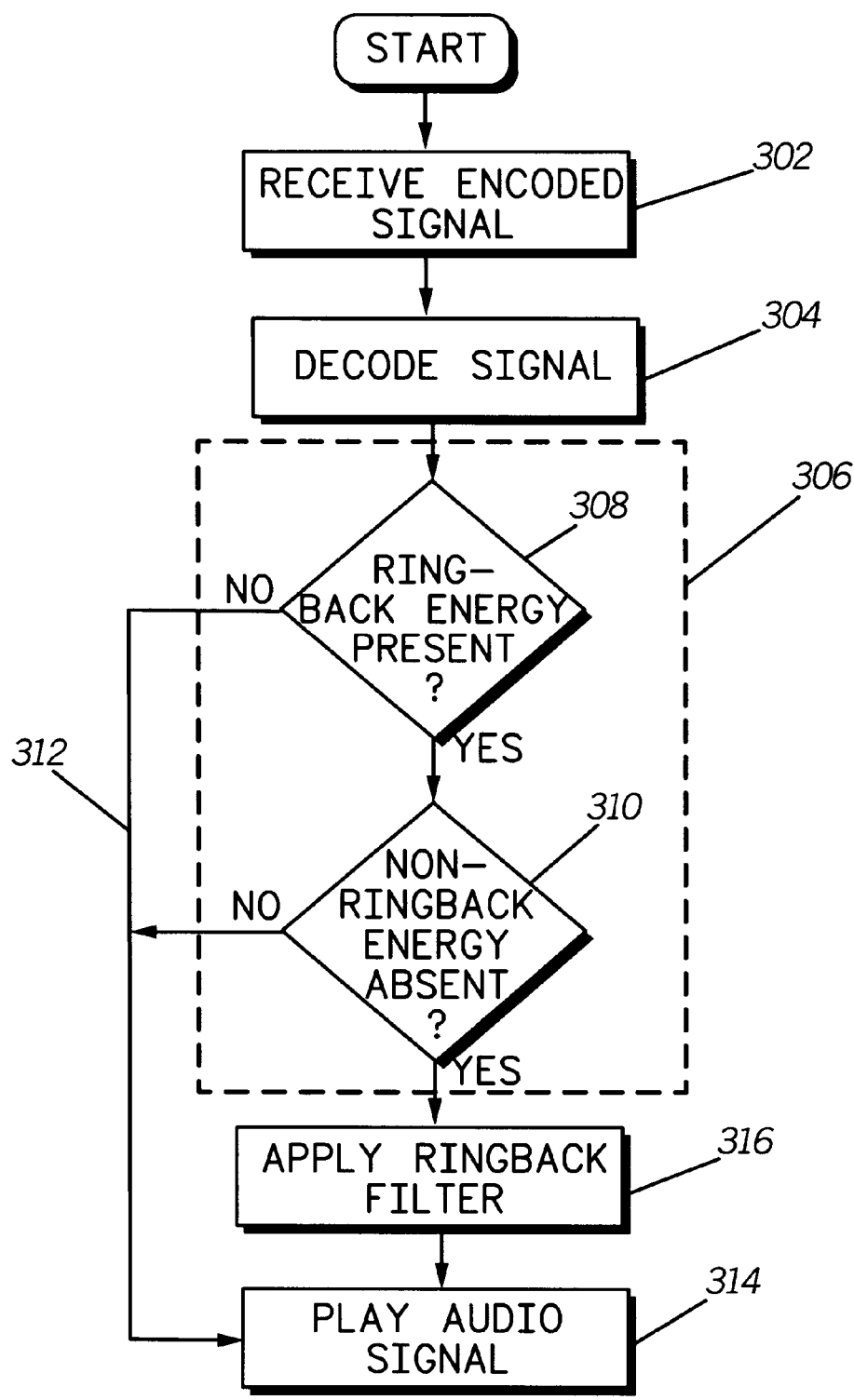
FIG. 3 shows a flow chart diagram of a method of reducing false ringback detection in accordance with one embodiment of the invention.

Referring now to FIG. 3, there is shown therein a flow chart diagram 300 for performing a method of reducing false ringback detection in accordance with one embodiment of the invention. The first step to be performed is to receive a signal 302, and it is contemplated that the received signal is digital and furthermore, an encoded digital signal. Accordingly, the next step to be performed is decoding 304 the received encoded signal to provide a decoded audio signal. More specifically, the decoded audio signal is a non-encoded digital signal comprising audio information, and may include ringback tone information, voice information, or both. By this it is meant that the digital information comprises no compression or error correcting codes. An example of a decoded audio signal would be a typical telephony pulse code modulation (PCM) signal. The next step is evaluating 306 the ringback and non-ringback content of the decoded audio signal. As indicated in FIG. 2, this is essentially a two step process, and the two steps may be performed in any order, or at the same time. The evaluating step includes determining if ringback energy is present 308. This step corresponds to the operation of the bandpass function 202, and may comprise comparing the energy level to a preselected ringback energy threshold level. The evaluating step further includes determining the degree of non-ringback energy 310, by, for example, comparing the non-ringback energy to a preselected voice energy threshold level. If either of the result of these evaluations indicate that voice information is present, even if there is energy in the ringback band, the decoded audio signal is not filtered, and passed 312 to the audio processor where the step of playing 314 the decoded audio signal is performed. However, if the evaluating steps indicate that ringback energy is present, and there is a lack of voice energy outside the ringback band, then the step of applying 316 a ringback filter is performed, providing a ringback filtered audio signal, which is passed to the audio processor where it is played.

Thus, the present invention solves the problem of the false ringback detection by establishing a two part test in evaluating a received signal to determine if a ringback tone or tones has been received. In order for the ringback filter to be applied to the received audio signal, both the ringback energy must be sufficiently high and the non-ringback energy must be sufficiently low. In accordance with a preferred embodiment of the invention, the means for performing these evaluations is a digital signal processor (DSP) operated in accordance with the principles disclosed hereinabove. In general, the functional blocks of the decoder 108, detection 112, switch 114, and ringback filter 118 could be implemented in either a hardware embodiment or a software embodiment. However, given the flexibility of software implementations, it is preferred that these functions be performed by software executed in a DSP. A significant benefit is derived from performing ringback detection in accordance with the present invention. Rather than using a complex LPC filter to a ringback band-only detection in accordance with the prior art, by using the dual evaluation presently disclosed, a simple, standard bandpass filter may be used to evaluate the ringback band. In fact, rather than having both an LPC filter for evaluating the ringback band and a ringback filter, as in the prior art, the ringback filter may be employed twice in the present invention; once to evaluate the ringback band, and again if the dual evaluation indicates the reception of a ringback signal. Thus, the present invention simplifies the complexity of filtering necessary to perform the ringback detection and ringback filtering.

While the preferred embodiments of the invention have been illustrated and described, it will be clear that the invention is not so limited.

Numerous modifications, changes, variations, substitutions and equivalents will occur to those skilled in the art without departing from the spirit and scope of the present invention as defined by the appended claims.

What is claimed is:

1. A method for reducing false ringback detection in a communication device, comprising:
    receiving an encoded audio signal;
    decoding the encoded audio signal to provided a decoded audio signal;
    determining a ringback energy level in a ringback band of the decoded audio signal;
    determining a non-ringback energy level in the decoded audio signal out of the ringback band of the decoded audio signal;
    applying a ringback filter to the decoded audio signal only when the energy in the ringback band is above a preselected ringback energy threshold level and the energy out of the ringback band is below a preselected voice energy threshold level.

2. A method for reducing false ringback detection as defined by claim 1, wherein the receiving comprises receiving a VSELP encoded audio signal.

3. A method for reducing false ringback detection as defined by claim 1, further comprising playing the decoded audio signal after performing the step of applying a ringback filter.

4. A method for reducing false ringback detection as defined by claim 1, wherein the determining the ringback energy level comprises applying a bandpass filter to the decoded audio signal, the bandpass filter for passing at least one ringback tone.

5. A method for reducing false ringback detection as defined by claim 1, wherein the determining the non-ringback energy level comprises applying a bandstop filter to the decoded audio signal, the bandstop filter for rejecting any ringback tones.

6. A method for reducing false ringback detection as defined by claim 1, wherein the applying the ringback filter comprises applying a bandpass filter to the decoded audio signal, the bandpass filter for passing at least one ringback tone.

7. A method for reducing false ringback detection in a received encoded audio signal, the method comprising the steps of:
    decoding the encoded audio signal to provide a decoded audio signal having an energy level;
    comparing the energy level of the decoded audio signal in a ringback band with a preselected ringback energy threshold level;
    comparing the energy level of the decoded audio signal out of the ringback band with a preselected non-ringback energy threshold level;
    applying a ringback filter to the decoded audio signal only if the energy level of the decoded audio signal in the ringback band is above the preselected ringback energy threshold level and the energy level of the decoded audio signal out of the ringback band is below the preselected non-ringback energy threshold level, the step of applying a ringback filter providing a ringback signal; and
    playing the ringback signal over an audio transducer.

8. A method for reducing false ringback detection as defined in claim 7, wherein the step of decoding comprises decoding according to a VSELP code scheme.

9. A method for reducing false ringback detection as defined in claim 7, wherein the step of comparing the energy level of the decoded signal in the ringback band comprises applying a bandpass filter to the decoded audio signal.

10. A method for reducing false ringback detection as defined in claim 7, wherein the step of comparing the energy level of the decoded signal out of the ringback band comprises applying a bandstop filter to the decoded audio signal.

11. A method for reducing false ringback detection as defined in claim 7, wherein the step of applying a ringback filter comprises applying a bandpass filter such that at least one ringback tone is passed and harmonics of the at least one ringback tone are rejected.

12. A communication device for providing telephone service and reducing false ringback detection, comprising:
    a receiver for receiving an encoded audio signal;
    a decoder for decoding the encoded audio signal to provide a decoded audio signal;
    detection means for detecting a ringback energy in a ringback band of the decoded audio signal and a non-ringback energy out of the ringback band; and
    a ringback filter for passing the ringback band of the decoded audio signal only when the ringback energy is above a preselected ringback energy threshold level and the non-ringback energy is below a preselected non-ringback energy level threshold.

13. A communication device as defined in claim 12, wherein the decoder is a VSELP decoder.

14. A communication device as defined in claim 12, wherein the decoder is a digital signal processor comprising instruction code for performing a decoding algorithm.

15. A communication device as defined in claim 12, wherein the detection means is a digital signal processor comprising instruction code for performing an energy level determination algorithm.

16. A communication device as defined in claim 12, wherein the ringback filter is a digital filter.

17. A communication device as defined in claim 16, wherein the digital filter is performed by a digital signal processor.

* * * * *